(12) United States Patent
Jeon et al.

(10) Patent No.: US 12,352,841 B2
(45) Date of Patent: Jul. 8, 2025

(54) SYSTEM AND METHOD FOR OBTAINING RELATIVE LOCATION OF ANCHOR-FREE UWB-BASED NODE

(71) Applicant: ELECTRONICS AND TELECOMMUNICATIONS RESEARCH INSTITUTE, Daejeon (KR)

(72) Inventors: Ji Hun Jeon, Daejeon (KR); Sang Yeoun Lee, Daejeon (KR); Jun Hee Park, Daejeon (KR); Kang Bok Lee, Daejeon (KR); Soo Young Jang, Daejeon (KR); Min Gi Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 475 days.

(21) Appl. No.: 17/845,238

(22) Filed: Jun. 21, 2022

(65) Prior Publication Data
US 2023/0236301 A1    Jul. 27, 2023

(30) Foreign Application Priority Data

Jan. 21, 2022   (KR) .................. 10-2022-0009512

(51) Int. Cl.
  *G01S 13/02*  (2006.01)
  *G01S 5/02*   (2010.01)
  (Continued)

(52) U.S. Cl.
  CPC ........ *G01S 13/0209* (2013.01); *G01S 5/0284* (2013.01); *G01S 13/04* (2013.01); *G01S 2013/468* (2013.01)

(58) Field of Classification Search
  CPC .... G01S 13/0209; G01S 5/0284; G01S 13/04; G01S 2013/468; G01S 2205/006; G01S 5/0289; G01S 5/10; G01S 2205/06
  See application file for complete search history.

(56) References Cited

U.S. PATENT DOCUMENTS

| 2008/0309556 A1* | 12/2008 | Hohl ............... H04W 64/00 342/451 |
| 2010/0039929 A1* | 2/2010 | Cho ............... G01S 5/02521 370/254 |

(Continued)

FOREIGN PATENT DOCUMENTS

| KR | 10-2009791 B1 | 8/2019 |
| KR | 10-2142982 B1 | 8/2020 |

(Continued)

OTHER PUBLICATIONS

W. Ming, "Distributed node location algorithm using non-anchor node clustering," 2016 11th International Conference on Computer Science & Education (ICCSE), Nagoya, Japan, 2016, pp. 505-511, doi: 10.1109/ICCSE.2016.7581632. (Year: 2016).*

(Continued)

*Primary Examiner* — William Kelleher
*Assistant Examiner* — Noah Yi Min Zhu
(74) *Attorney, Agent, or Firm* — LRK PATENT LAW FIRM

(57) ABSTRACT

There is provided a method performed by a system for obtaining a relative location of an anchor-free UWB-based node. The method includes obtaining relative distances between a plurality of nodes based on UWB sensor values between the nodes, constructing a relative coordinate system having a center node of the plurality of nodes as a base, and calculating coordinate values of other nodes in the relative coordinate system. The constructing of the relative coordinate system having the center node of the plurality of nodes (Continued)

as a base includes constructing the relative coordinate system based on a relative distance between the center node and another node and absolute values of y axis values.

14 Claims, 7 Drawing Sheets

(51) Int. Cl.
*G01S 13/04* (2006.01)
*G01S 13/46* (2006.01)

(56) References Cited

U.S. PATENT DOCUMENTS

| | | | |
|---|---|---|---|
| 2012/0095673 A1 | 4/2012 | Choi et al. | |
| 2017/0248428 A1 | 8/2017 | Cho et al. | |
| 2019/0037348 A1* | 1/2019 | Yang | G01C 21/188 |
| 2021/0048526 A1* | 2/2021 | Booij | G01S 5/0009 |
| 2021/0185491 A1* | 6/2021 | Chakraborty | G06F 18/22 |

FOREIGN PATENT DOCUMENTS

| | | |
|---|---|---|
| KR | 10-2021-0111615 A | 9/2021 |
| KR | 10-2021-0112675 A | 9/2021 |

OTHER PUBLICATIONS

G. Jianquan and Z. Wei, "An Anchor Free Location Algorithm for Large Scale Wireless Sensor Networks," 2008 IEEE/ASME International Conference on Mechtronic and Embedded Systems and Applications, Beijing, China, 2008, pp. 7-12, doi: 10.1109/MESA.2008.4735726. (Year: 2008).*

* cited by examiner

D1: DISTANCE BETWEEN TAG AND TERMINAL 1
D2: DISTANCE BETWEEN TAG AND TERMINAL 2
D3: DISTANCE BETWEEN TAG AND TERMINAL 3

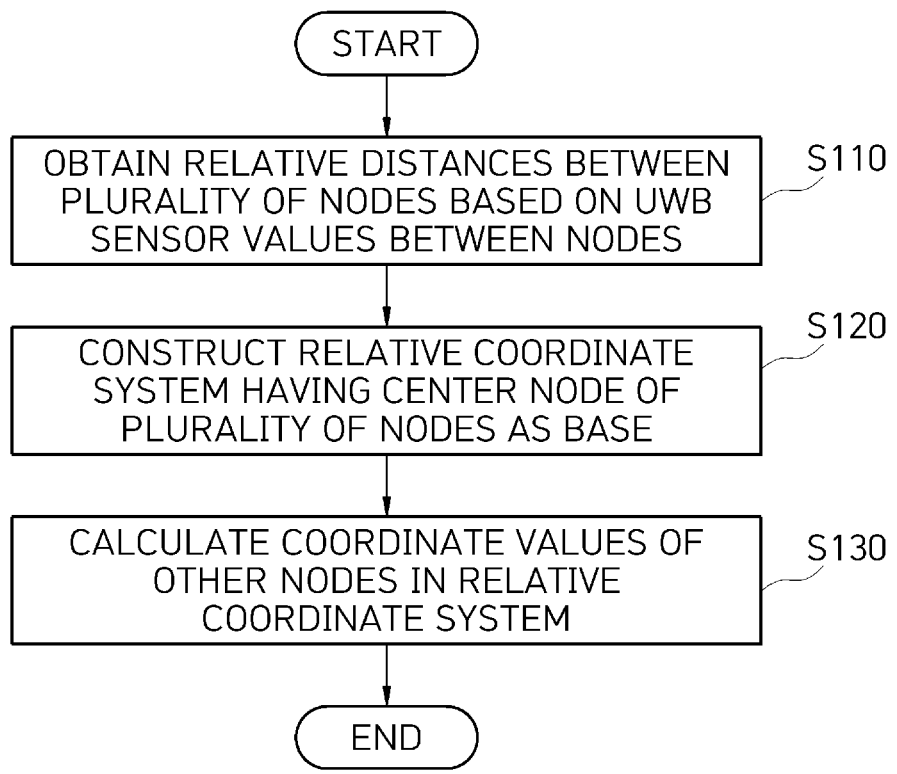

FIG. 4
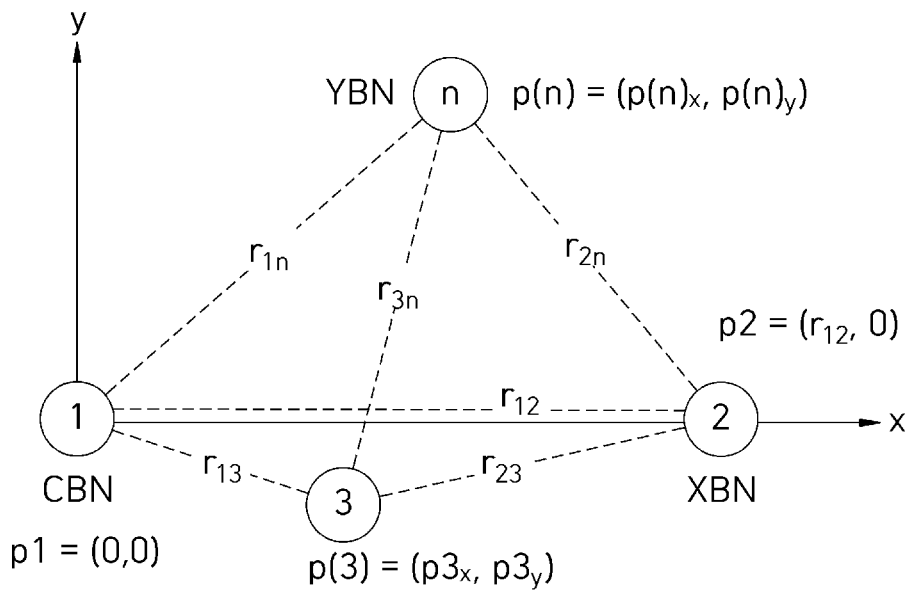
FIG. 5
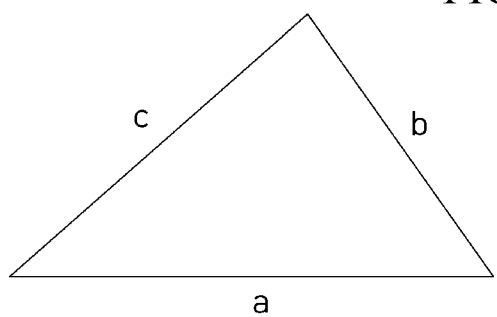
<CONDITION FOR DRAWING TRIANGLE>
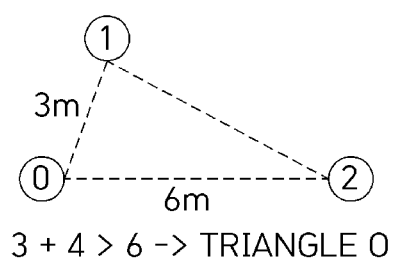
3 + 4 > 6 -> TRIANGLE O
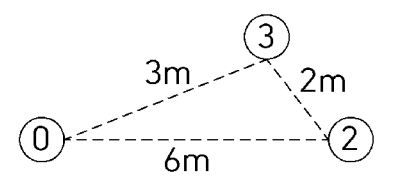
3 + 4 > 6 -> TRIANGLE X
<EXAMPLE OF DRAWN TRIANGLE>

SYSTEM AND METHOD FOR OBTAINING RELATIVE LOCATION OF ANCHOR-FREE UWB-BASED NODE

CROSS-REFERENCE TO RELATED APPLICATION

This application claims priority to and the benefit of Korean Patent Application No. 10-2022-0009512, filed on Jan. 21, 2022, the disclosure of which is incorporated herein by reference in its entirety.

BACKGROUND

1. Technical Field

The present disclosure relates to a system and method for obtaining a relative location of an anchor-free ultra wideband (UWB)-based node and, particularly, to a system and method for obtaining a relative location of an anchor-free UWB-based node, which may be applied to disaster circumstances.

2. Description of Related Art

A UWB is a short-distance wireless communication technology for transmitting a large amount of information in a band wider than the existing frequency band by using low power. The UWB has been in the spotlight along with a thing of Internet (IoT) service because the UWB has an advantage in that it can accurately measure a distance between devices and locations of the devices, and has characteristics in that the UWB has low power consumption and is robust against electronic jamming signals. In particular, the UWB enables communication even in an indoor environment including many obstacles due to the characteristics of a wide band and enables indoor positioning through the communication, and thus emerges as wireless communication suitable for being used in a disaster situation.

A conventional navigation algorithm using a UWB may obtain, in a room, a location of a node that is currently moving with a high accuracy by fixing nodes that play a role as anchors and measuring a relative distance between the node that is currently moving and each of the anchor nodes. However, a disaster circumstance is a situation in which it is difficult to fix such nodes playing a role as anchors and to precisely measure a distance between the anchors. Accordingly, it is difficult to use a UWB in fire fighting activities in actual disaster circumstances.

SUMMARY

Various embodiments are directed to providing a system and method for obtaining a relative location of an anchor-free ultra wideband (UWB)-based node, which can be used in fire fighting activities in actual disaster circumstances and can be aware of how far away fellow firefighters are from himself or herself in which direction through relative distance navigation even without previously installing an anchor node or precisely measuring a distance between anchors.

However, an object to be solved by the present disclosure is not limited to the aforementioned object, and other objects may be present.

In a first aspect of the present disclosure, a method performed by a system for obtaining a relative location of an anchor-free ultra wide band (UWB)-based node includes obtaining relative distances between a plurality of nodes based on UWB sensor values between the nodes, constructing a relative coordinate system having a center node of the plurality of nodes as a base, and calculating coordinate values of other nodes in the relative coordinate system. In this case, the constructing of the relative coordinate system having the center node of the plurality of nodes as the base includes constructing the relative coordinate system based on a relative distance between the center node and another node and absolute values of y axis values.

In a second aspect of the present disclosure, a system for obtaining a relative location of an anchor-free ultra wide band (UWB)-based node includes a plurality of nodes configured to obtain relative distances between the nodes based on UWB sensor values between the nodes, and a relative location acquisition unit installed in each of the plurality of nodes and configured to construct a relative coordinate system having a center node as a base and calculate coordinate values of other nodes in the relative coordinate system. In this case, the relative location acquisition unit constructs the relative coordinate system based on a relative distance between the center node and another node and absolute values of y axis values.

In a third aspect of the present disclosure, an anchor-free ultra wide band (UWB)-based node capable of obtaining a relative location from each of a plurality of nodes includes a communication module configured to obtain a relative distance based on a UWB sensor value for each of the plurality of nodes, a memory configured to store a program for obtaining the relative locations of the plurality of nodes based on the obtained relative distances, and a processor configured to construct a relative coordinate system having a center node as a base based on the relative distances between an ego-node set as the center node and other nodes and absolute values of y axis values and calculate coordinate values of other nodes in the relative coordinate system, by executing the program stored in the memory.

In another aspect of the present disclosure, a computer program is combined with a computer, that is, hardware, executes the system and method for obtaining a relative location of an anchor-free UWB-based node, and is stored in a computer-readable recording medium.

Other details of the present disclosure are included in the detailed description and the drawings.

According to the embodiment of the present disclosure, how far away other nodes are from an ego-node in which direction can be confirmed by using a relative coordinate system even without installing an anchor node in advance or precisely measuring a distance between anchors, unlike in the existing UWB navigation.

According to the present disclosure, there is an advantage in that the present disclosure can be immediately applied without a long preparation period even in a first-visited place because the present disclosure does not require a process of directly installing a node and precisely measuring a distance from the installed node. Through such an advantage, locations of rescue workers can be easily identified by using the present disclosure for rescue activities in actual disaster circumstances.

Effects of the present disclosure are not limited to the aforementioned effects, and effects not described above may be evidently understood from the following description by those skilled in the art.

BRIEF DESCRIPTION OF THE DRAWINGS

FIG. 3 is a flowchart of a method of obtaining a relative location of an anchor-free UWB-based node according to an embodiment of the present disclosure.

FIG. 4 is a diagram for describing contents in which a relative coordinate system is constructed according to an embodiment of the present disclosure.

FIG. 5 is a diagram for describing an embodiment if a triangle cannot be drawn.

DETAILED DESCRIPTION

Figure 1:
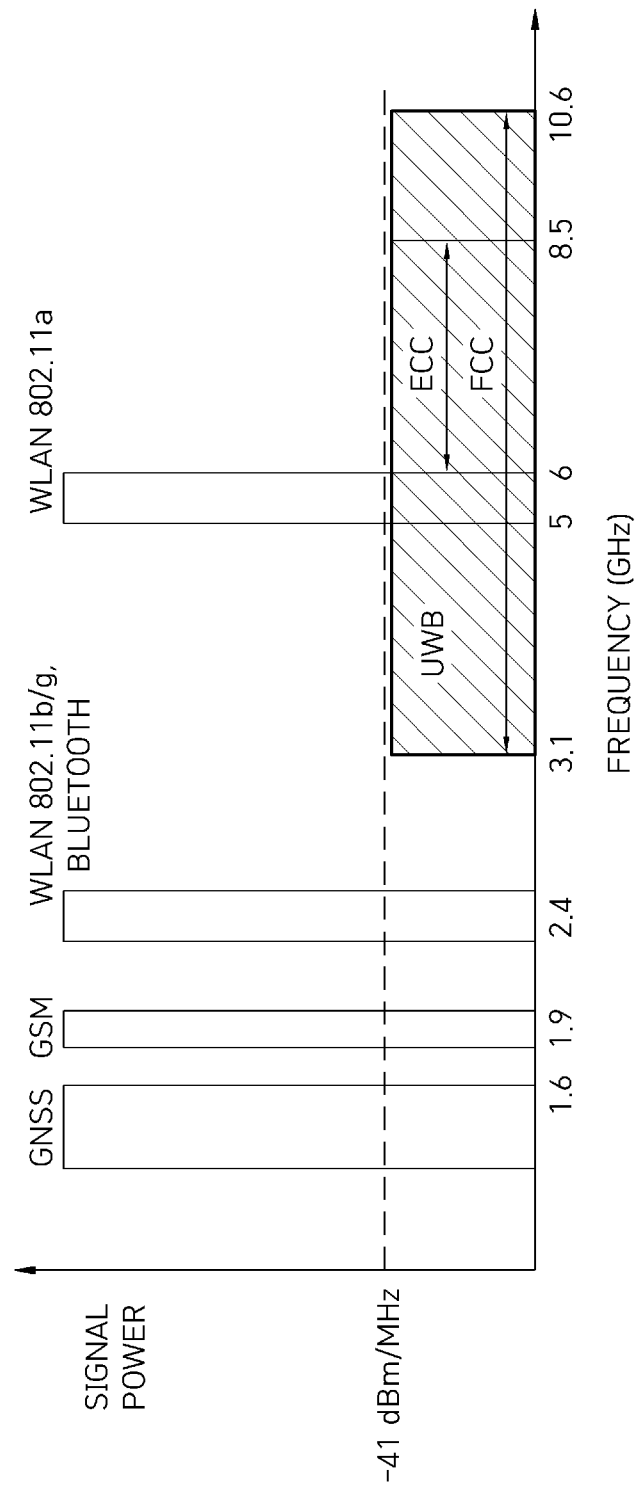
FIG. 1 is a diagram illustrating frequency ranges of various communication methods.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various elements, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Hereinafter, in order to help understanding of those skilled in the art, a background on which the present disclosure has been conceived is first described and the present disclosure is then described in detail.

Figure 2A:
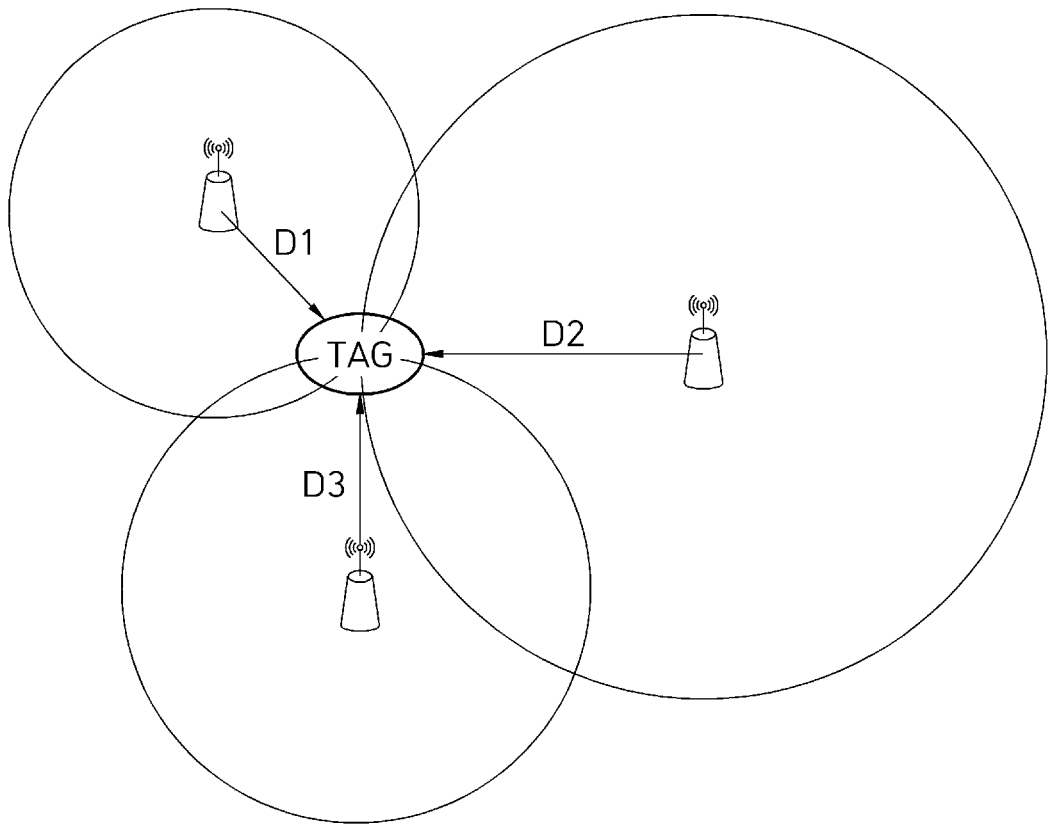
FIGS. 2A and 2B are diagrams illustrating a conventional UWB-based distance calculation method.
Figure 2B:
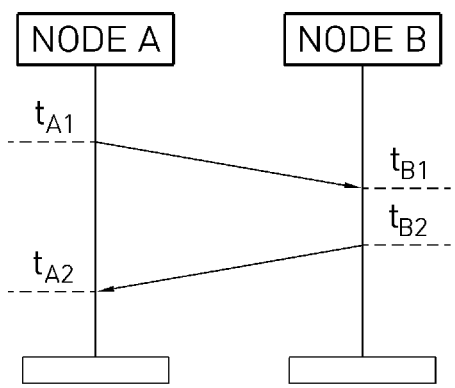

FIG. 1 is a diagram illustrating frequency ranges of various communication methods. FIGS. 2A and 2B are diagrams illustrating a conventional UWB-based distance calculation method.

An ultra wideband (UWB), as a term means, is a method of transmitting a radio signal in a wide frequency band. A UWB communication method is a promising technology in an indoor communication and positioning field because a UWB has a stronger tolerance to a multi-signal error than Bluetooth or Wi-Fi and can pass through building materials to some degree.

A method of calculating a distance between devices by measuring a time difference until a radio wave transmitted by a radio transmitter of one device is detected by a radio receiver of another device is called time of arrival (ToA). In general, in a UWB, a two-way ToA method of calculating a distance between two devices is used based on a time difference until a signal is received again after the signal is transmitted between the two nodes.

As described above, UWB communication capable of obtaining a relative distance between nodes even in an indoor space after a UWB passes through building materials in a wide frequency band recently emerges as a communication and positioning method suitable for indoor disaster circumstances. In general, a method of obtaining a location of a moving node by fixing nodes that play a role as anchors at several fixed reference locations that will become reference axes and obtaining and calculating relative distances between the moving node and the fixed anchors is used as a navigation algorithm using a UWB.

In such conventional UWB-based navigation, location information having high precision can be obtained even in an indoor space. However, there is a need for pre-conditions in which anchor nodes need to be fixed and installed in advance and reference locations between the fixed anchors need to be accurately measured. Due to such problems, it is difficult to use UWB-based navigation in a first-visited space.

Although the UWB method is in the spotlight as a communication and positioning method suitable for indoor disaster circumstances, the UWB method is not used in urgent and actual disaster circumstances due to the aforementioned problems.

In contrast, a system and method for obtaining a relative location of an anchor-free UWB-based node according to an embodiment of the present disclosure apply an anchor-free UWB navigation algorithm that does not require the fixing and installation of anchor nodes that will become a reference. Although the anchor-free UWB navigation algorithm has some limitations in an indoor positioning performance and display method compared to the existing UWB navigation algorithm, the anchor-free UWB navigation algorithm may be more useful in actual disaster situations.

That is, although an accurate indoor location that was first obtained is obtained when a conventional navigation algorithm is applied to disaster circumstances, the conventional navigation algorithm may not be applied to the disaster circumstances by taking into consideration that information on an indoor structure of a building may not be previously obtained, that it is difficult to check an indoor structure due to smoke, and that a changed situation, such as collapse in an internal structure of a building obtained due to a disaster, may occur.

Embodiments of the present disclosure provide a system and method for obtaining a relative location of an anchor-free UWB-based node, which can be used in fire fighting activities in actual disaster circumstances and can be aware of how far away fellow firefighters are from himself or herself in which direction through a relative distance navigation even without installing an anchor node in advance or precisely measuring a distance between anchors.

Hereinafter, a method performed by a system 100 for obtaining a relative location of an anchor-free UWB-based node according to an embodiment of the present disclosure is described with reference to FIGS. 3 to 8.

FIG. 3 is a flowchart of a method of obtaining a relative location of an anchor-free UWB-based node according to an embodiment of the present disclosure.

In a method of obtaining a relative location of an anchor-free UWB-based node according to an embodiment of the present disclosure, first, relative distances between a plurality of nodes are obtained based on UWB sensor values between the nodes (S110). That is, according to the present disclosure, after each node obtains relative distance information with respect to another node based on a UWB, all the nodes share corresponding relative distance information.

Next, a relative coordinate system is constructed having a center node of the plurality of nodes as a base (S120). In order to construct the relative coordinate system by using an anchor-free UWB-based relative navigation algorithm according to an embodiment of the present disclosure, terms are defined as in FIG. 2.

FIG. 4 is a diagram for describing contents in which a relative coordinate system is constructed according to an embodiment of the present disclosure.

First, a user (e.g., a firefighter) may set a location of his or her node as the starting point of a relative coordinate system. Such a node is referred to as a center node (i.e., a center base node (CBN)).

Furthermore, a node having the farthest relative distance from the center node among a plurality of nodes is detected as a node that determines an X axis. Such a node is referred to as an X axis node (i.e., an X base node (XBN)). Furthermore, a line that is drawn in the direction of an X axis node from the center node is set as a positive X axis.

Thereafter, a Y axis is set by using the center node and the X axis node as a base. In this case, the Y axis is set to have 90 degrees to the X axis so that an upper side of the center node and the X axis node has a positive sign.

Thereafter, coordinate values of the plurality of nodes are obtained based on relative distances between the plurality of nodes. For example, a triangle having the relative distances between the plurality of nodes as respective sides is drawn. A coordinate value of each node may be obtained based on attribute information of the drawn triangle. That is, x and y locations of an n-th node in the relative coordinate system may be obtained as in Equation 1 below through the second law of cosines by which an angle of the triangle can be aware when the length of each side of the triangle is known.

$$p_x(n) = \frac{r_{1n}^2 + r_{12}^2 - r_{2n}^2}{2r_{12}}, \quad p_y(n) = \pm\sqrt{r_{1n}^2 - p_x(n)} \quad \text{[Equation 1]}$$

In this case, a location $p_y$ of the reference Y axis in the relative coordinate system is produced as an equal root (±) as in Equation 1. Accordingly, there is a problem in that it is not possible to know whether the value of the location is a positive value or a negative value. In this case, after Y axis values of the nodes are calculated, a node having the greatest absolute value among the Y axis values is set as a Y axis node (i.e., a Y base node (YBN)), that is, a node disposed in the positive Y axis.

Figure 6:
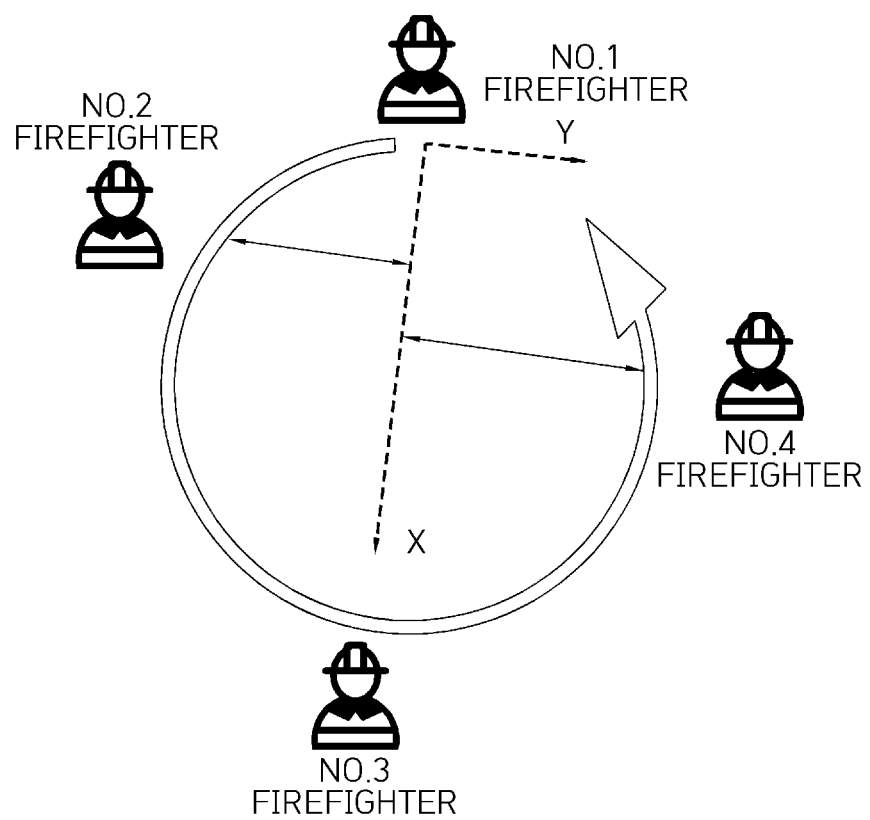
FIG. 6 is a diagram for describing an initializing process in an embodiment of the present disclosure.

FIG. 5 is a diagram for describing an embodiment if a triangle cannot be drawn. FIG. 6 is a diagram for describing an initializing process in an embodiment of the present disclosure.

A situation may occur in which coordinate values cannot be calculated through the second law of cosines as relative distance values of a UWB because a triangle is not drawn depending on the arrangement of nodes as illustrated in FIG. 5, in addition to the Y axis equal root problem in the relative coordinate system.

In order to solve such a problem, an embodiment of the present disclosure may apply an initializing process. In the initializing process, first, a plurality of nodes are disposed in a given direction sequence. In an embodiment of the present disclosure, the nodes are disposed in a counterclockwise sequence. In this case, the arrangement of nodes that cannot constitute a triangle is excluded, and a sign of an initial Y axis is also made known.

For example, if four nodes are operated as in FIG. 6, the first to fourth nodes are disposed in a counterclockwise direction. In this case, when a relative coordinate system is set by using the first node as a base, the first node becomes a center node, and the third node having the farthest relative distance from the first node becomes an X axis node (XBN). Thereafter, Y axis absolute values of the remaining nodes are calculated. As a result of comparisons between the Y axis absolute values, the fourth node becomes a Y axis node (YBN) because the fourth node has the greatest Y axis absolute value. In this case, it may be seen that a Y axis sign direction of the Y axis node becomes a positive value when taking into consideration that the Y axis is set so that an upper side of the center node and the X axis node has a positive sign and the four nodes are disposed in the counterclockwise direction. Although the second node becomes the Y axis node because the second node has the greatest Y axis absolute value, a Y axis sign direction in an equal root may be determined by taking into consideration that the four nodes are disposed in the counterclockwise direction.

Next, coordinate values of other nodes in the relative coordinate system are calculated (S130).

Figure 7:
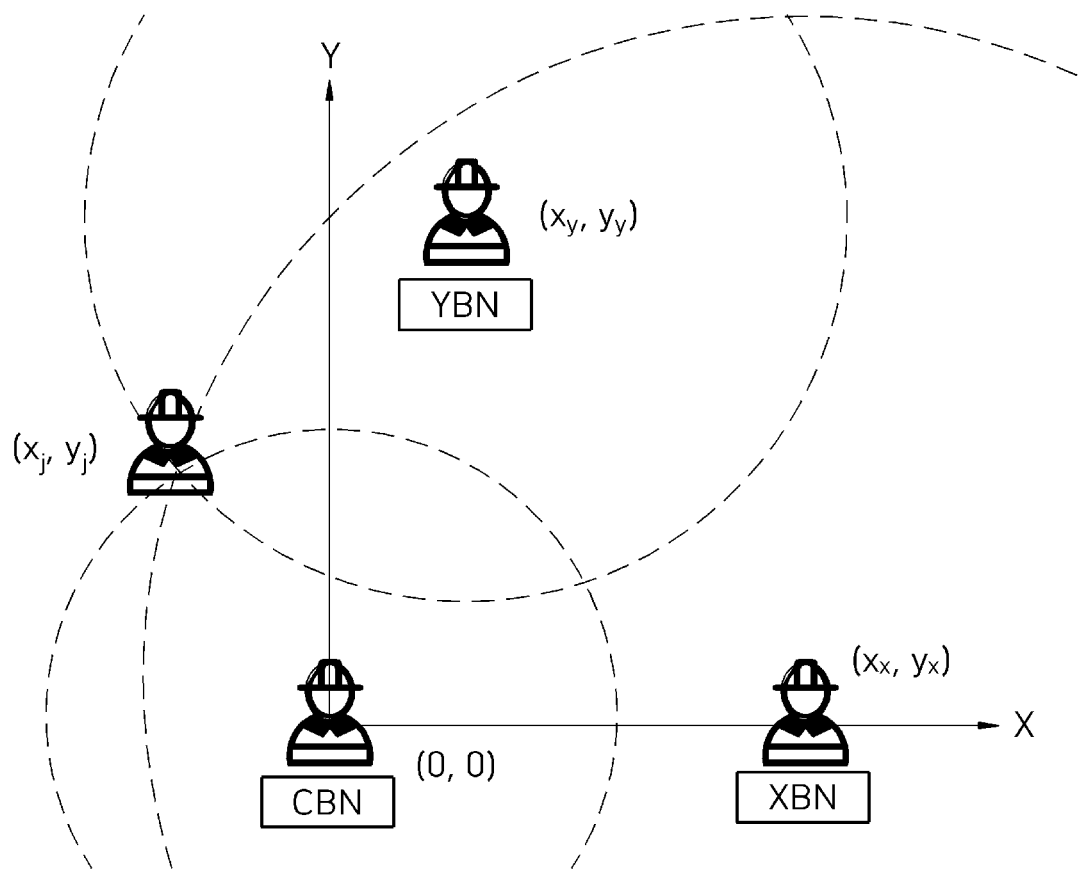
FIG. 7 is a diagram for describing contents in which a coordinate value of a specific node is obtained in a relative coordinate system.

FIG. 7 is a diagram for describing contents in which a coordinate value of a specific node is obtained in a relative coordinate system.

Y axis signs of the remaining nodes may be calculated through Equation 2 to Equation 5 below.

$$(x_x - x_j)^2 + (y_x - y_j)^2 = r_x^2 \quad \text{[Equation 2]}$$

$$(x_y - x_j)^2 + (y_y - y_j)^2 = r_y^2 \quad \text{[Equation 3]}$$

$$x_j^2 + y_j^2 = r_j^2 \quad \text{[Equation 4]}$$

$$\begin{pmatrix} x_j \\ y_j \end{pmatrix} = \begin{pmatrix} x_x & y_x \\ x_y & y_y \end{pmatrix}^{-1} \frac{1}{2} \begin{pmatrix} x_x^2 + y_x^2 + r_j^2 - r_x^2 \\ x_y^2 + y_y^2 + r_j^2 - r_y^2 \end{pmatrix} \quad \text{[Equation 5]}$$

Since three coordinate values of the center node, the X axis node, and the Y axis node are calculated in the previous process, a location of a specific node may be obtained as a point where three circles are met by drawing, in the form of each circle, a relative distance from each of three points to the specific node.

That is, information on a circle having, as a radius, a relative distance from each of the center node, the X axis node, and the Y axis node as the specific node may be set. A coordinate value of a point with which all of pieces of information on the circles come into contact at the same time may be obtained as a coordinate value of the specific node.

In this case, the reason why the Y axis sign of the Y axis node is produced as an equal root in the previous process is that when a circle is drawn, only two circles are drawn by using the center node and the X axis node as a base and thus two points at which the circles are met are produced. In contrast, one coordinate value, not the equal root, may be obtained because three circles can be drawn after up to the Y axis node along with the center node and the X axis node is determined.

As described above, after an initial location coordinate value of each node in a relative coordinate system is obtained, a location of each node can be continuously estimated by updating a relative distance obtained for each given time even though the nodes are randomly moved and updating a location coordinate value of each node in the relative coordinate system based on the updated relative distance.

Figure 8:
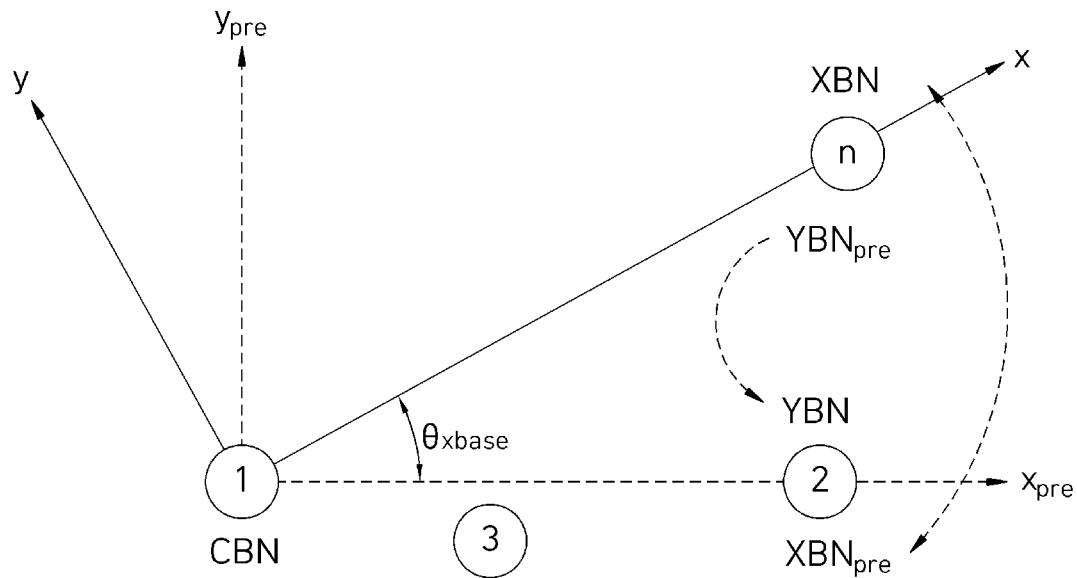
FIG. 8 is a diagram for describing contents in which a relative coordinate system is updated.

FIG. 8 is a diagram for describing contents in which a relative coordinate system is updated.

After initial location coordinate values of nodes are obtained, if the nodes continue to move, at least one of initially determined locations of an X axis node (XBN) and a Y axis node (YBN) may be changed. In this case, a new relative coordinate system is constructed based on a relative distance for a changed location. Furthermore, coordinate values of other nodes may be updated by performing a two-dimensional rotation conversion by using an axis of a previously constructed relative coordinate system as an axis of the new relative coordinate system.

$$\theta_{xbase} = \text{atan2}(p_y(XBN), p_x(XBN)) \quad \text{[Equation 6]}$$

$$\begin{pmatrix} p_x(n) \\ p_y(n) \end{pmatrix} = \begin{pmatrix} \cos\theta_{xbase} & \sin\theta_{xbase} \\ -\sin\theta_{xbase} & \cos\theta_{xbase} \end{pmatrix} \begin{pmatrix} p_{x_{pre}}(n) \\ p_{y_{pre}}(n) \end{pmatrix}$$

In the case of an embodiment of the present disclosure, in Equation 5, a situation in which an inverse matrix cannot be calculated depending on coordinate values of the X axis node and the Y axis node may occur. In this case, an X axis node and an Y axis node are determined among other nodes except nodes in which the inverse matrix does not occur, and coordinate values of the X axis node and the Y axis node are updated as in FIG. 8.

Thereafter, the process returns to the step of obtaining relative distances between the plurality of nodes based on UWB sensor values between the nodes, and the relative distances between the nodes are updated based on UWB sensor values changed as the nodes are moved. In this case, an equal root of the Y axis node may be determined by taking into consideration a Y axis coordinate sign before the update. Furthermore, a process of updating coordinate values of other nodes is repeatedly performed by using the center node, the X axis node, and the Y axis node as a base.

In the aforementioned description, steps S110 to S130 may be divided into additional steps or combined as smaller steps depending on an implementation example of the present disclosure. Furthermore, some steps may be omitted if necessary, and the sequence of the steps may be changed. Furthermore, although other contents are omitted, the contents of FIGS. 3 to 8 may also be applied to a system 100 for obtaining a relative location of an anchor-free UWB-based node in FIG. 9.

Figure 9:
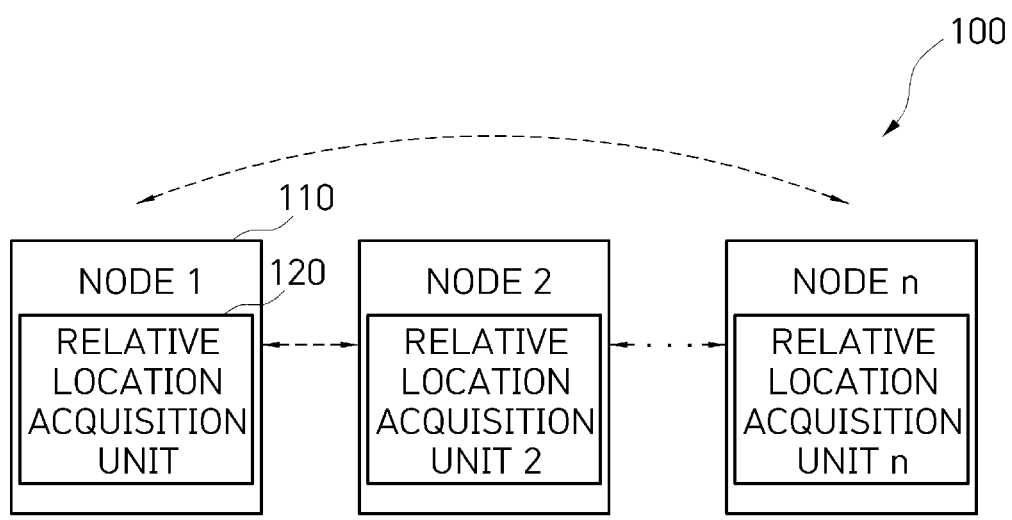
FIG. 9 is a block diagram of a system for obtaining a relative location of an anchor-free UWB-based node according to an embodiment of the present disclosure.

FIG. 9 is a block diagram of the system 100 for obtaining a relative location of an anchor-free UWB-based node according to an embodiment of the present disclosure.

The system 100 for obtaining a relative location of an anchor-free UWB-based node according to an embodiment of the present disclosure includes a plurality of nodes 110 and relative location acquisition units 120.

The plurality of nodes 110 obtains relative distances between the nodes based on UWB sensor values between the nodes.

The relative location acquisition unit 120 is installed in each of the plurality of nodes, and it constructs a relative coordinate system having a center node as a base and calculates coordinate values of other nodes in the relative coordinate system. In this case, the relative location acquisition unit 120 constructs the relative coordinate system based on a relative distance between the center node and another node and absolute values of y axis values.

The node 110 according to the present disclosure is constructed to include a communication module (not illustrated), a memory (not illustrated), and a processor (not illustrated).

The communication module obtains a relative distance based on a UWB sensor value for each of the plurality of nodes.

The memory stores a program for obtaining relative locations of the plurality of nodes based on relative distances between the plurality of nodes obtained through the communication module. The processor executes the program stored in the memory.

The processor constructs a relative coordinate system having the center node as a base based on a relative distance between an ego-node, set as the center node, and another node and absolute values of y axis values and calculates coordinate values of other nodes in the relative coordinate system, by executing the program.

The aforementioned embodiment of the present disclosure may be implemented as a program (or application) and stored in a medium in order to be executed by being combined with a computer, that is, hardware.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method performed by a system for obtaining a relative location of an anchor-free ultra wide band (UWB)-based node, the method comprising:
   obtaining relative distances between each node and other nodes among a plurality of nodes based on UWB sensor values between each node and the other nodes;
   constructing a relative coordinate system having each node as a base, wherein each node is set as a center node relative to the other nodes when constructing the relative coordinate system; and
   calculating coordinate values of the other nodes in each of the relative coordinate systems,
   wherein the constructing of the relative coordinate system having each node as the base comprises:
   setting, as a node that determines an X axis (hereinafter referred to as an "X axis node"), a node having a farthest relative distance from each node of the plurality of nodes;
   setting a Y axis by using each node and the X axis node as a base;
   obtaining coordinate values of the other nodes based on the relative distances between each node and the other nodes; and
   setting, as a node disposed in a positive Y axis (hereinafter referred to as a "Y axis node"), a node having a greatest absolute value of the y axis values of the coordinate values among the other nodes.

2. The method of claim 1, wherein the obtaining of the coordinate values of the other nodes based on the relative distances between each node and the other nodes comprises:
   drawing a triangle having the relative distances between each node and the other nodes as respective sides; and
   obtaining the coordinate values based on attribute information of the drawn triangle.

3. The method of claim 2, further comprising:
   when a triangle is unable to be drawn based on the relative distances between each node and the other nodes, performing an initializing process,
   wherein the initializing process comprises:
   disposing the plurality of nodes in a given direction sequence; and
   excluding a node incapable of constituting the triangle.

4. The method of claim 1, wherein the calculating of the coordinate values of the other nodes in each of the relative coordinate systems comprises:
   setting a circle having a relative distance from each of the center node, the X axis node, and the Y axis node to a specific node as each radius; and
   obtaining, as a coordinate value of the specific node, a coordinate value of a point with which the circles come into contact at the same time.

5. The method of claim 4, wherein the obtaining of the relative distances between each node and the other nodes among the plurality of nodes based on the UWB sensor values between each node and the other nodes comprises updating a relative distance obtained for each given time when at least one of the plurality of nodes moves.

6. The method of claim 5, wherein:
   the constructing of the relative coordinate system having each node as the base comprises constructing a new relative coordinate system based on a relative distance for a changed location of at least one of the X axis node and the Y axis node when the location of the at least one of the X axis node and the Y axis node is changed, and
   the calculating of the coordinate values of the other nodes in each of the relative coordinate systems comprises updating the coordinate values of the other nodes by performing a two-dimensional rotation conversion by using an axis of a previously constructed relative coordinate system as an axis of a new relative coordinate system.

7. A system for obtaining a relative location of an anchor-free ultra wide band (UWB)-based node, the system comprising:
   a plurality of nodes configured to obtain relative distances between each node and other nodes among the plurality of nodes based on UWB sensor values between each node and the other nodes; and
   a relative location acquisition unit installed in each node of the plurality of nodes and configured to construct a relative coordinate system having each node as a base and calculate coordinate values of the other nodes in each of the relative coordinate systems, wherein each node is set as a center node relative to the other nodes when constructing each of the relative coordinate systems,
   wherein the relative location acquisition unit is configured to:
   set, as a node that determines an X axis (hereinafter referred to as an "X axis node"), a node having a farthest relative distance from each node of the plurality of nodes,
   set a Y axis by using each node and the X axis node as a base,
   obtain coordinate values of the other nodes based on the relative distances between each node and the other nodes, and
   set, as a node disposed in a positive Y axis (hereinafter referred to as a "Y axis node"), a node having a greatest absolute value of the y axis values of the coordinate values among the other nodes.

8. The system of claim 7, wherein the relative location acquisition unit
   draws a triangle having the relative distances between each node and the other nodes as respective sides, and
   obtains the coordinate values based on attribute information of the drawn triangle.

9. The system of claim 8, wherein when a triangle is unable to be drawn based on the relative distances between each node and the other nodes, the relative location acquisition unit performs an initializing process which comprises disposing the plurality of nodes in a given direction sequence and excluding a node incapable of constituting the triangle.

10. The system of claim 7, wherein the relative location acquisition unit
    sets a circle having a relative distance from each of the center node, the X axis node, and the Y axis node to a specific node as each radius, and
    obtains, as a coordinate value of the specific node, a coordinate value of a point with which the circles come into contact.

11. The system of claim 10, wherein the relative location acquisition unit updates a relative distance obtained for each given time when at least one of the plurality of nodes moves.

12. The system of claim 11, wherein the relative location acquisition unit
    constructs a new relative coordinate system based on a relative distance for a changed location of at least one of the X axis node and the Y axis node when the location of the at least one of the X axis node and the Y axis node is changed, and
    updates the coordinate values of the other nodes by performing a two-dimensional rotation conversion by using an axis of a previously constructed relative coordinate system as an axis of a new relative coordinate system.

13. An anchor-free ultra wide band (UWB)-based node capable of obtaining a relative location from each of a plurality of nodes, the node comprising:
    a communication module configured to obtain relative distances between each node and other nodes among the plurality of nodes based on UWB sensor values between each node and the other nodes;
    a memory configured to store a program for obtaining the relative locations of the plurality of nodes based on the obtained relative distances; and
    a processor configured to construct a relative coordinate system having each node as a base based on the relative distances between each node and the other nodes and absolute values of y axis values and calculate coordinate values of the other nodes in each of the relative coordinate systems, by executing the program stored in the memory, wherein each node is set as a center node relative to the other nodes when constructing each of the relative coordinate systems,
    wherein the processor is further configured to:
    set, as a node that determines an X axis (hereinafter referred to as an "X axis node"), a node having a farthest relative distance from each node of the plurality of nodes,
    set a Y axis by using each node and the X axis node as a base,
    obtain coordinate values of the other nodes based on the relative distances between each node and the other nodes, and
    set, as a node disposed in a positive Y axis (hereinafter referred to as a "Y axis node"), a node having a greatest absolute value of the y axis values of the coordinate values among the other nodes.

14. The anchor-free UWB-based node of claim 13, wherein the processor is further configured to:
    draw a triangle having the relative distances between each node and the other nodes as respective sides, and
    obtain the coordinate values based on attribute information of the drawn triangle,
    wherein when a triangle is unable to be drawn based on the relative distances between each node and the other nodes, the processor is configured to perform an initializing process which comprises disposing the plurality of nodes in a given direction sequence and excluding a node incapable of constituting the triangle.

* * * * *